Oct. 13, 1931.  W. M. TENNEY  1,827,049
ENGINEER'S PLUMB ROD
Filed April 4, 1928
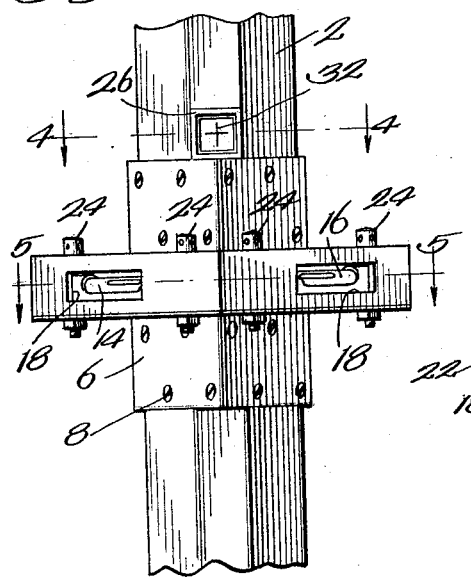
Fig. 2.
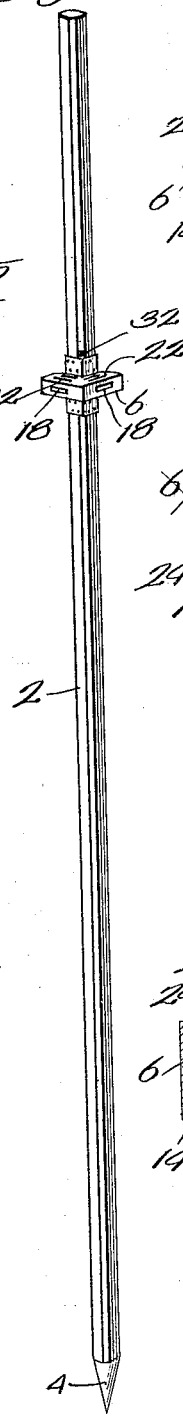
Fig. 1.
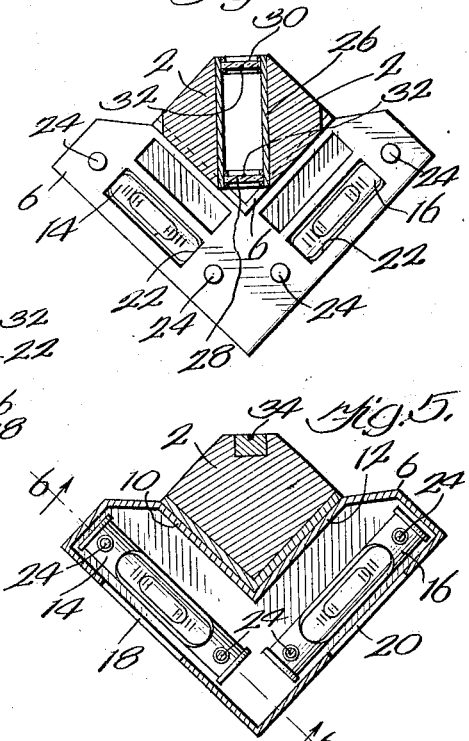
Fig. 4.
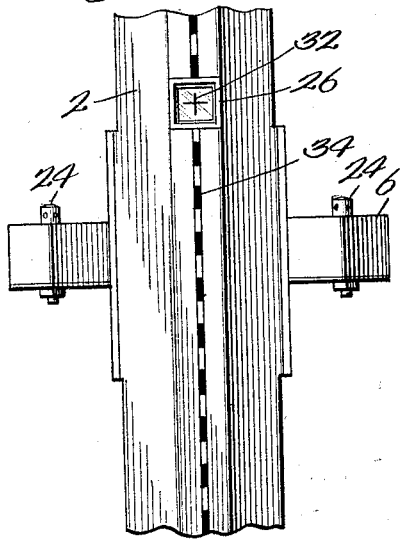
Fig. 3.
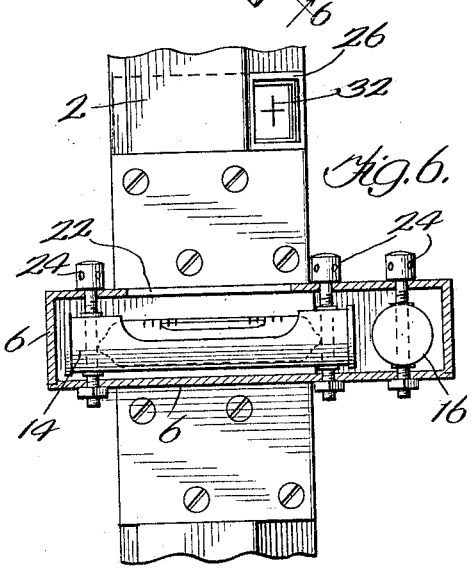
Fig. 5.
Fig. 6.
Inventor:
Walter M. Tenney
By Cheever & Cox
Attys.

Patented Oct. 13, 1931

1,827,049

UNITED STATES PATENT OFFICE

WALTER M. TENNEY, OF CHICAGO, ILLINOIS

ENGINEER'S PLUMB ROD

Application filed April 4, 1928. Serial No. 267,360.

My invention relates to a plumb rod used in surveying and taking other measurements.

One of the objects of my invention is to provide a plumb rod carrying a bubble indicator for showing when the rod is held in exact vertical position.

Still another object of my invention resides in providing a plumb rod which has a bubble indicator mounted thereon at approximately the eye level of the person of average height and which in addition thereto carries a hairline sight glass for viewing indicating marks, which sight glass is placed immediately above the bubble indicator for convenience and use.

Yet another object of my invention resides in the novel construction of plumb rod wherein the front of the rod is provided with a vertically disposed series of graduations and wherein the back of the rod is provided at the desirable height with bubble indicators disposed in a horizontal plane at right angles to each other, and also wherein the plumb rod is provided with a sight glass preferably extending through the rod and preferably immediately above the bubble indicator for convenience in sighting distant indicating marks.

Yet another object of my invention resides in providing a plumb rod of the construction described wherein the placing of the rod is made possible irrespective of wind or other air currents such as would preclude the use of an ordinary plumb bob.

These and other objects of my invention will be apparent from a perusal of the following specification when taken in connection with the accompanying drawings wherein—

Fig. 1 is a perspective view of my plumb rod looking from the rear thereof,

Fig. 2 is an enlarged view from the rear thereof,

Fig. 3 is a corresponding front view,

Fig. 4 is a section on line 4—4 of Fig. 2,

Fig. 5 is a section on line 5—5 of Fig. 2,

Fig. 6 is a section on line 6—6 of Fig. 5.

Referring now to the drawings in detail, my improved device comprises a relatively long and rigid pole or rod 2 which may be and preferably is about six to eight feet in height and which is provided at its bottom end with the usual metallic point 4 whereby it may be placed at an exact point. In order that this rod may be placed in exact vertical position to insure the taking of accurate measurements, I have provided it with an attached housing or bracket 6 which is adapted to be secured as by means of screws 8 to the sides of the pole at a point just below the eye level of the average person. At this point the rod has a somewhat square-shaped cross section as shown at Fig. 5 so as to snugly fit the correspondingly shaped sides 10 and 12 of the preferably metallic housing 6. This housing extends in a horizontal plane from the sides 10 and 12 and is hollow so as to enclose two bubble indicators 14 and 16 which, as illustrated clearly in Fig. 5 of the drawings, are disposed at right angles the one to the other. These bubble indicators are of any desired construction and are preferably each mounted in a cylindrical metal shell having the usual sight opening both at side and top so that the position of the bubble may be seen through similar openings 18 and 20 in the sides of the casing and also through openings 22 in the top of the casing 6. Any desired means may be provided for adjusting each of the bubble indicators so as to tilt them relatively to a true horizontal plane. In the present instance I provide turning screws 24 which are threadedly connected to the cylinders containing the bubble indicators 14 so that by turning the screws 24 the corresponding end of the bubble indicator may be slightly raised or lowered.

Immediately above the bracket and housing 6 containing the bubble indicators I provide the rod 2 with a bore in which I locate a sight glass 26 which extends transversely through the rod in a true horizontal plane. The glasses 28 and 30 of this sight glass are provided with the usual hair lines 32 for making the desired alignments. In addition the front face of the rod is provided with a longitudinally extending graduated line 34 which at the front face is interrupted by the sight glass 26. These glasses, 28 and 30, are preferably magnified lenses.

It will be noted that this sight glass is located just above the level of the bubble indicators, which provides a most convenient arrangement whereby the operator using the rod may glance at his location of the right-angularly disposed bubble indicators practically without withdrawing his eye from the sight glass 26. It will of course be obvious that I do not restrict the location of this sight glass to a position above the bubble indicators, but I prefer its disclosed location for purposes of convenience.

It must be obvious that as a result of my construction I have provided a cheap, sturdy and economical rod which may be used in all kinds of weather, either windy or calm, and which can be placed in exact vertical position on a desired point simply by insuring that the bubbles in the two angularly disposed indicators are at their center points. In the usual plumb bob type of device where the vertical location of the device depends upon the true position of the plumb bob, slight currents of air or wind will so sway the bob as to prevent the exact positioning of the device; whereas in the present construction this objectionable feature is eliminated and a rod wherein the indicators are arranged as an integral and permanent part thereof is provided.

Furthermore by the arrangement of my simple housing I am enabled to protect and enclose the bubble glasses and to provide a simple type of adjustment for raising or lowering either end thereof.

Having thus described my invention what I claim as new and desire to secure by Letters Patent is:—

1. In a device of the class described, the combination of a relatively long rod having a pointed base and carrying a graduating mark longitudinally along its front face, said rod having its rear face provided with two walls disposed at right angles one to the other, with their junction diagonally opposite the graduating mark on the front face, and two bubble indicators mounted on said rod, said bubble indicators having their longitudinal axes substantially parallel to the right angularly disposed faces of the rod at such point.

2. In a device of the class described, the combination of a relatively long rod having a pointed base, said rod being substantially square in cross section, a hollow housing having two faces disposed at right angles to each other and fitting two adjacent sides of said square cross section, said housing carrying two bubble indicators, said indicators being arranged therein with their longitudinal axes parallel to the two right angularly disposed faces of the housing and adjusting screws at the ends of said bubble indicators for raising or lowering said ends, said rod having a bore passing diagonally through the intersection of said right angularly disposed faces adjacent said housing, and a sight glass located in said bore.

3. In a device of the class described, the combination of a relatively long rod having a pointed base and carrying a graduating mark longitudinally along its front face, said rod having its rear face provided with two walls disposed at substantially right angles to each other, the junction of said walls being diagonally opposite from the face provided with graduated marks, a sight glass carried by the rod which is positioned relatively to the graduated face so that when said glass is in use said face will be positioned normally in a forward direction with respect to the user, and a pair of bubble indicators mounted on said rod along the two angularly disposed faces and immediately below said sight glass, whereby the user, in making sights, can observe the position of the two bubble indicators without disturbing the position of the body with respect to the sight glass.

In witness whereof, I have hereunto subscribed my name.

WALTER M. TENNEY.